United States Patent [19]

Tsikos

[11] Patent Number: 4,608,638

[45] Date of Patent: Aug. 26, 1986

[54] APPARATUS FOR ACCUMULATING AND PERMANENTLY STORING STATISTICAL INFORMATION

[75] Inventor: Constantine Tsikos, Pennsauken, N.J.

[73] Assignee: Siemens Corporate Research & Support Inc., Iselin, N.J.

[21] Appl. No.: 544,162

[22] Filed: Oct. 21, 1983

[51] Int. Cl.⁴ .......................... G06F 15/20; G06F 13/00

[52] U.S. Cl. .................................... 364/424; 364/900; 340/52 F

[58] Field of Search ........................ 364/424, 200, 900; 340/52 R, 52 F; 365/94, 96, 189; 377/20

[56] References Cited

U.S. PATENT DOCUMENTS

| | | | |
|---|---|---|---|
| 4,031,363 | 6/1977 | Freeman et al. | 364/424 |
| 4,071,892 | 1/1978 | Genzling | 364/424 |
| 4,072,850 | 2/1978 | McGlynn | 364/424 |
| 4,114,450 | 9/1978 | Schulman et al. | 364/551 |
| 4,128,900 | 12/1978 | Lappington | 365/94 |
| 4,156,926 | 5/1979 | Hartman | 364/900 |
| 4,159,531 | 6/1979 | McGrath | 364/424 |
| 4,176,397 | 11/1979 | Crom et al. | 364/561 |
| 4,250,487 | 2/1981 | Arnold | 340/799 |
| 4,258,421 | 3/1981 | Juhasz et al. | 364/424 |
| 4,338,512 | 7/1982 | Ludwig | 377/20 |
| 4,395,624 | 7/1983 | Wartski | 364/424 |
| 4,441,164 | 4/1984 | Pavan et al. | 365/94 |
| 4,470,116 | 9/1984 | Ratchford | 364/424 |

FOREIGN PATENT DOCUMENTS

| | | |
|---|---|---|
| 2081909 | 2/1982 | United Kingdom . |
| 2095408 | 9/1982 | United Kingdom . |

OTHER PUBLICATIONS

Research Disclosure, Nov. 1979, Heft 187, Nr. 18743.

*Primary Examiner*—Gary Chin
*Attorney, Agent, or Firm*—John Francis Moran

[57] ABSTRACT

Apparatus is disclosed for accumulating (counting) the occurrences of different types of events (such as trips travelled by an automobile) and storing these counts in substantially permanent form. The apparatus includes a logic element for determining both the occurrence of an event (trip travelled) and the type of event (length of trip), and a non-volatile memory such as a "fusable-link" PROM or UV-erasable PROM, associated with and connected to the logic element, for accumulating and substantially permanently storing the statistical information.

6 Claims, 8 Drawing Figures

ROUTINE "PBB" (PREPARE TO BURN BIT)

APPARATUS FOR ACCUMULATING AND PERMANENTLY STORING STATISTICAL INFORMATION

BACKGROUND OF THE INVENTION

The present invention relates to apparatus for determining and storing, in a non-volatile, substantially permanent memory, certain statistical information. More particularly, the invention concerns apparatus for accumulating (counting) the occurrences of different types of events and storing these counts in substantially permanent form.

There are many situations in which the occurrences of events of different types are to be counted to create statistical data in the nature of a historical profile. For example, it would be desirable to record a "milage histogram" of a motor vehicle, such as an automobile. Although most motor vehicles have a mechanism (either mechanical or electronic) called an "odometer" for permanently recording the total number of miles that the vehicle has been driven, this data (total miles) is not very informative about the condition of the vehicle. Data concerning the length of the trips that the vehicle has been driven would be also very valuable in evaluating the condition of the vehicle and in determining the vehicle accident potential for the calculation of premiums in automobile insurance.

Thus, in addition to an odometer which registers only the total miles driven, it would be desirable to provide means for permanently recording the "driving history" of the motor vehicle—more specifically, information about the number and types of trips traveled by the motor vehicle—during the life of the vehicle. As an example, the trips may be classified into different trip lengths; namely, trips of one mile or less; trips of one to two miles; two to three miles, etc. By separately counting the numbers of trips in each type or category (e.g., three mile trips), a "milage histogram" may be developed during the life of the vehicle. At the time of resale of this vehicle, this milage history would indicate to a prospective buyer the condition of the vehicle, thereby assisting both buyer and seller in determining an appropriate purchase price.

Other types of events for which statistics may be kept are numerous and varied. For example, in the case of a motor vehicle or an airplane, it may be desirable to accumulate statistics about the number of hours running time of the engine (event) at the different possible running speeds of the engine (type of event). For example, it may be desirable to know how many hours an engine was operated in the different speed ranges of 500–1000 RPM; 1000–1500 RPM; 1500–2000 RPM; . . . etc.

Statistics of this type are not limited to vehicles or engines, however. For example, it may be desirable to accumulate statistics about the use of electricity over a certain period of time (event) such as KWH/month during the period of the year or during the period that a total number of kilowatt hours are consumed. In this case, the KWH consumed for one month (event) may be classified into different "slices" of power consumed (type of event) such as 50–100 KWH/Mo.; 100–150 KWH/Mo.; 150–200 KWH/Mo . . . etc.

Still another example of an "event" involves the notes played by a musical instrument, such as a piano or organ, over the life of the instrument or even during the playing of a single musical composition. In addition to the total number of notes played, it would be desirable to know the relative frequencies with which the individual keys of the instrument are struck. Thus, the type of note (A, B, C, D . . . etc.) becomes the type of event.

In accumulating statistics of the above-mentioned kind, it would be desirable to store these data in a non-volatile memory in a substantially permanent manner so that the contents of the memory cannot be easily changed or tampered with. Thus, for example, the use of a conventional random access memory would permit the accumulated data to be readily changed so that the data could easily be falsified.

SUMMARY OF THE INVENTION

An object of the present invention is to provide apparatus for determining the number of occurrences of a certain event which may be categorized into different types of events.

A further object of the present invention is to provide apparatus for determining into which type or class each particular one of a plurality of events should be classified.

A further object of the present invention is to provide apparatus for obtaining the type of statistical information mentioned immediately above and for storing this information in substantially permanent form.

These objects, as well as further objects which will become apparent from the discussion that follows, are achieved, according to the present invention, by providing (a) a logic element for determining both the occurrence of an event and the type of such an event, and (b) a non-volatile memory, associated with and connected to the logic element, for accumulating and substantially permanently storing the statistical information.

In a preferred embodiment of the present invention, the memory may comprise a "fusable-link", programmable read-only memory (PROM) in which stored bits, all originally all set to their "0" state, may be destructively "burned" into their opposite state. Since the states of the bits may be changed only once, this type of memory offers complete security against unauthorized changing of the statistical information.

As an alternative, an erasable PROM (EPROM), for which the contents may be changed by the application of ultraviolet light, may also be used, provided that the EPROM is manufactured without the usual UV light window, or its UV light window is rendered opaque.

Other types of electronic or mechanical memories may also be employed with the present invention. The criteria for such a memory are that it be "non-volatile" (that is, that the memory be capable of retaining its stored contents even when power thereto is removed); that the memory comprise a plurality of bit storage locations with all of the bits stored in the locations being originally set to the same, first logical state (e.g., 0); and that the memory comprise memory control means for setting the bits in selected ones of the bit locations to their opposite logical state (e.g., 1). The memory control means must be capable of changing the state of each bit only once so that, when the bits are set to their second, opposite state, they are substantially permanently stored.

For a full understanding of the present invention, reference should now be made to the following detailed description of one preferred embodiment of the invention and to the accompanying drawings.

DESCRIPTION OF THE PREFERRED EMBODIMENT

A preferred embodiment of the present invention will now be described with reference to FIGS. 1-5 of the drawings.

Figure 1:
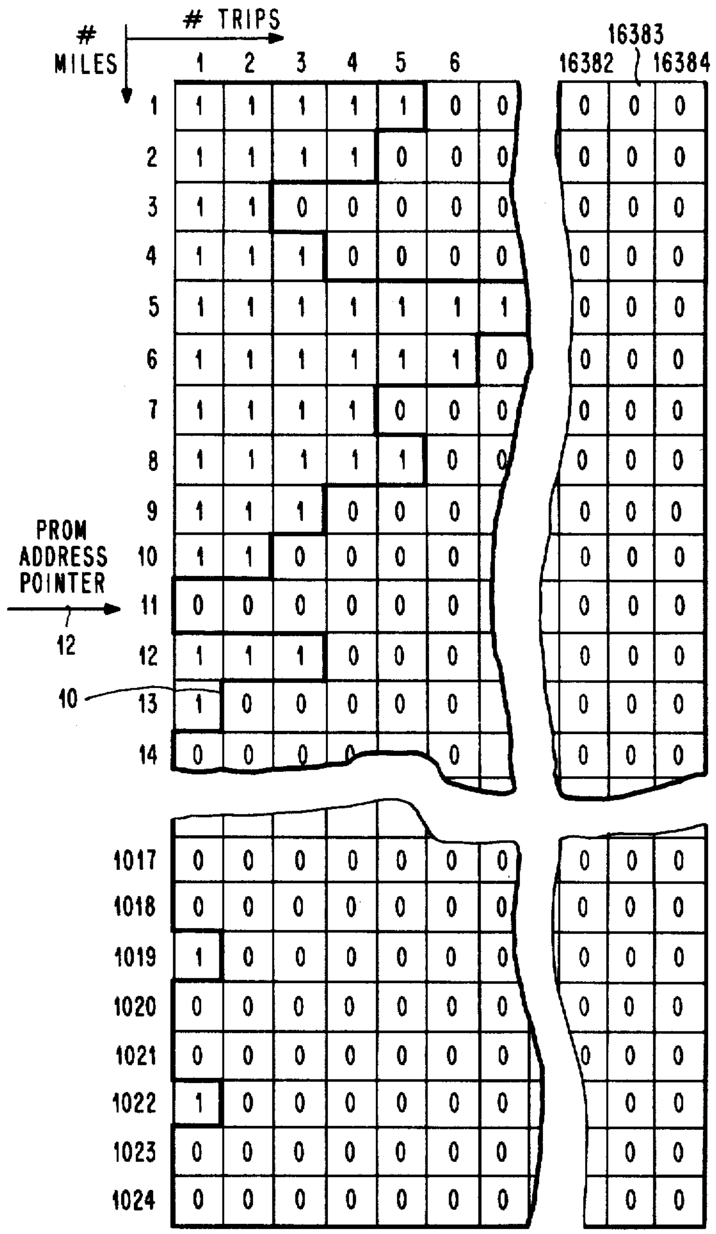
FIG. 1 is a representational diagram of the contents of a programmable read-only memory, illustrating the memory organization as well as the principle of operation of the present invention.

FIG. 1 illustrates how a programmable read-only memory may be organized to record the number of trips travelled by a motor vehicle in different milage categories. In this case, the memory can store 16,777,216 bits total, organized as 1024 bits deep and 16,384 bits wide. It is capable of recording trips of any length up to and including 1024 miles, with the maximum number of trips in any category being 16,384. In the example shown, the PROM has recorded 5 one mile trips, 4 two mile trips, 2 three mile trips, 3 four mile trips, etc., thus providing a "histogram" or milage history of a motor vehicle as outlined by the heavy line 10.

In the nomenclature which will be used herein after, the 1024 possible categories of trips are stored in 1024 "bins" in the PROM. The proper bin is found by a PROM "address pointer" 12. Within each bin, the memory contains a plurality of bytes (2048 groups of 8 bits). Originally, all of the bits contained in each bin are set to 0. The memory is designed to permit one change of state of every bit—namely, from 0 to 1—by appropriate application of signals to the memory address, data and control inputs. Once a bit has been set to 1, however, its state cannot be changed again.

At any time, the contents of the memory—that is, the states of all the bits—may be read out via the data outputs by appropriate application of address and control signals to the address and control inputs, respectively.

Memories of the above-described type are commercially available. Such memories are known as "fusable link" programmable read-only memories or "ultraviolet light erasable" programmable read-only memories. Memories of the latter type can be secured against erasure of the stored data by packaging the semiconductor chip in a dual in-line (DIP) package without an ultraviolet light window.

A suitable memory of the EPROM type is the TMS 2564 JL, manufactured by Texas Instruments, Inc., Dallas, Tex. 75265. Since the TMS 2564 is an 8K×8 (65,536-bit) memory, a plurality of such memories would be necessary to store the trip data described above. For example, five 565,536-bit (64K) memories may be used with their contents organized in the manner shown in the following table:

| PROM # | PURPOSE | NUMBER OF BINS | BIN LENGTH | TOTAL OF BITS | MILE RANGE |
|---|---|---|---|---|---|
| 1 | very short trips | 4 | 16,384 | 65,536 | 1 to 4 |
| 2 | short trips | 16 | 4,096 | 65,536 | 5 to 16 |
| 3 | medium trips | 64 | 1,024 | 64,536 | 17 to 64 |
| 4 | long trips | 256 | 256 | 65,536 | 65 to 256 |
| 5 | very long trips | 1024 | 64 | 65,536 | 256 to 1024 |

This memory organization takes advantage of the fact that a motor vehicle obviously travels most frequently on very short trips and travels very seldom on very long trips. Some prior knowledge of motor vehicle trip statistics would be helpful to provide the most efficient organization of memory while avoiding the possibility of overflow.

Figure 2:
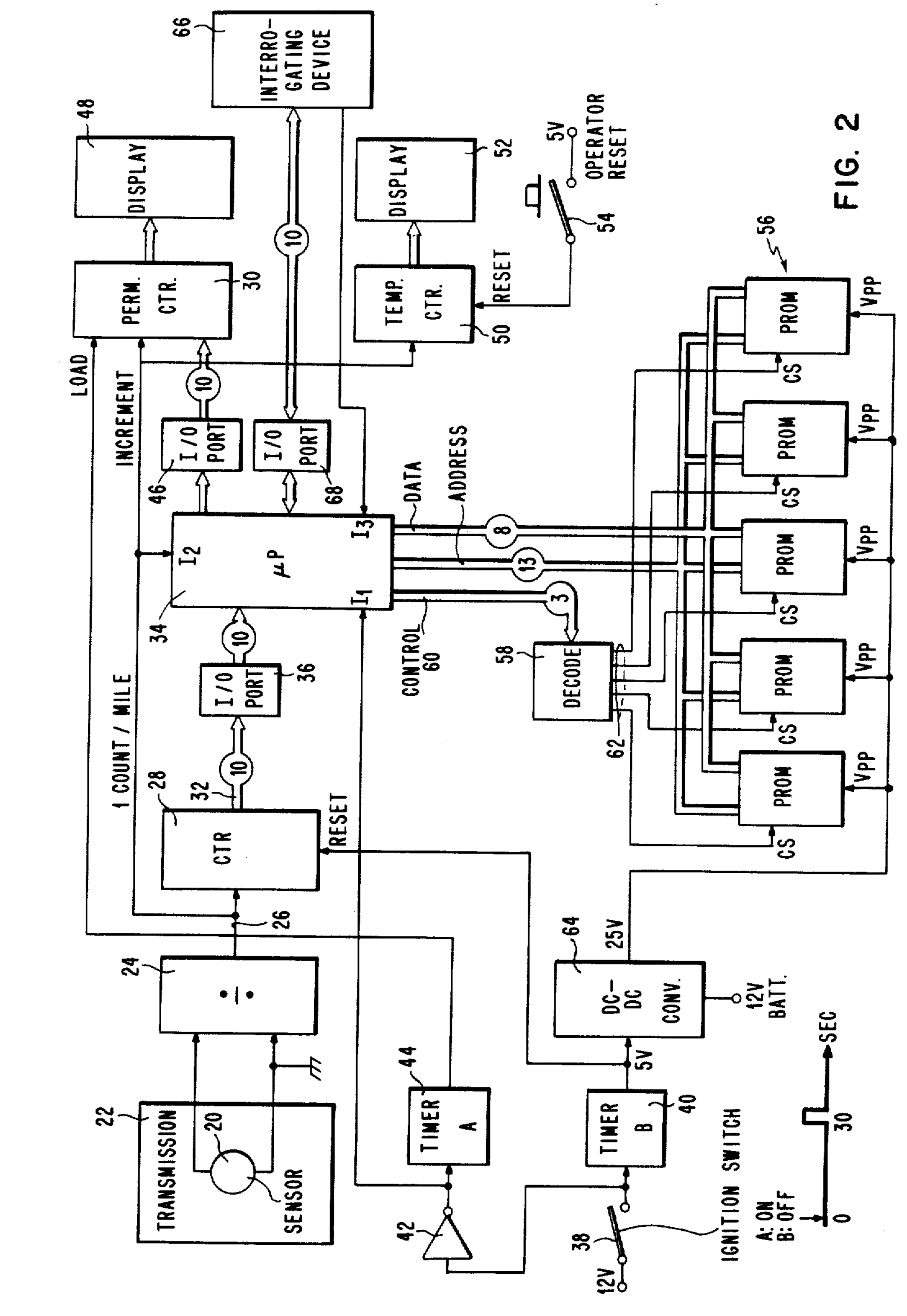
FIG. 2 is a block diagram of a microprocessor based circuit, according to a preferred embodiment of the present invention, for accumulating and permanently storing the numbers of trips travelled by a motor vehicle, where the trips fall into mileage categories.
Figure 3A:
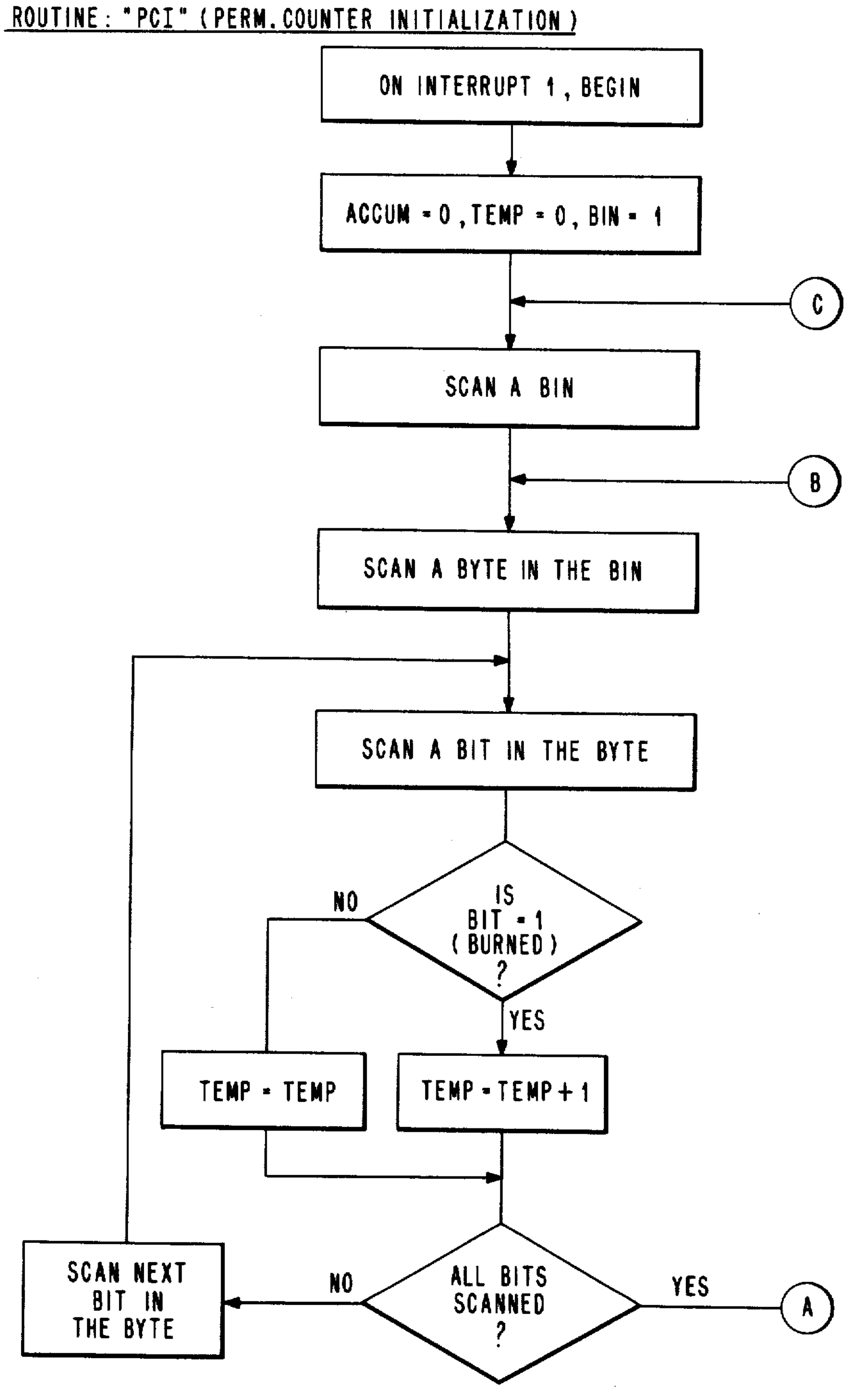
FIGS. 3A and 3B are flowcharts of a firmware routine called "Permanent Counter Initialization" used in the microprocessor in the apparatus of FIG. 2.
Figure 3B:
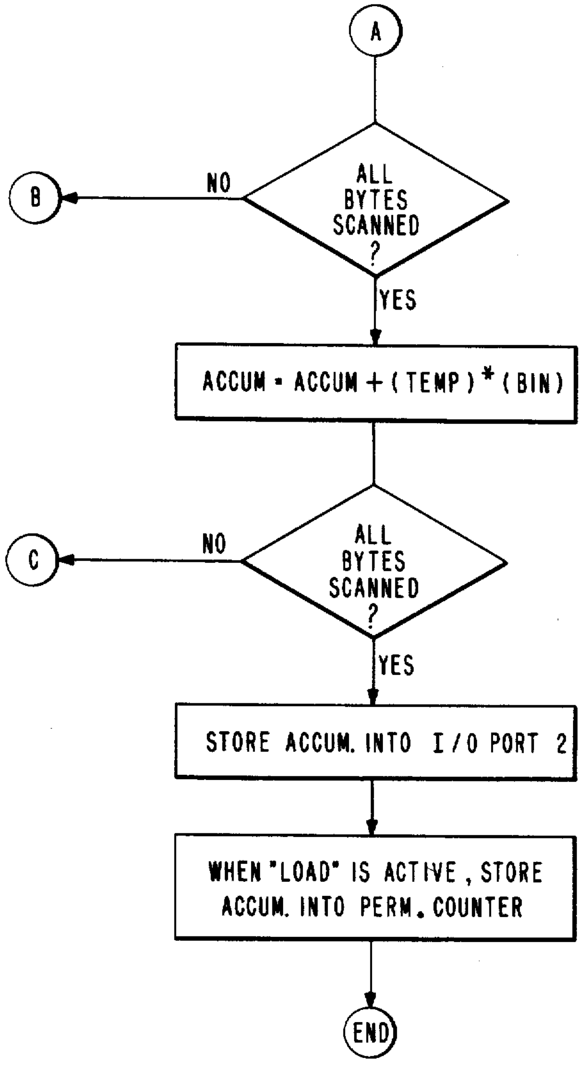

A preferred embodiment of apparatus for accumulating and permanently recording data concerning the trip miles travelled by a motor vehicle is illustrated in FIG. 2. Starting in the upper left corner of this figure, FIG. 2 shows an electronic sensor 20 arranged at the output shaft of the vehicle transmission 22 which produces one signal pulse for each revolution of this shaft. The signal is passed to a divider 24 which counts the input pulses and produces one pulse on its output line 26 each time the vehicle has travelled one mile. The signal on line 26 is passed both to a resettable digital counter 28 and to a "permanent counter" 30. The purpose of this permanent counter will be explained below. The counter 28 produces a 10-bit parallel digital signal on its output lines 32 which is supplied to a microprocessor 34 via an I/O port 36. The microprocessor thus receives a running count of the miles travelled by the vehicle during each trip, starting at zero at the beginning of the trip.

The counter 28 is reset to zero each time the ignition switch 38 is turned off. To avoid restarting the counter 28 from zero when the ignition switch is turned off only momentarily, as when the vehicle is stalled in traffic, a timer 40 is provided which produces a reset pulse thirty seconds after the ignition switch is turned off. If the ignition switch is turned off and subsequently turned on again before the timer 40 "times out" at the end of the thirty second interval, the timer 40 does not produce an output pulse.

The ignition switch 38 is also connected via an inverting amplifier 42 to a second timer 44. This timer 44 produces an output pulse 30 seconds after the ignition switch has been turned on. The pulse, so produced, is passed to the permanent counter 30 to cause it to load an initial count received from the microprocessor 34 via an I/O port 46. The contents of the permanent counter 30 are indicated by a display device 48.

After a number is loaded into the permanent counter 30, this number is incremented by the pulses provided on line 26 (one pulse per mile). These pulses are also supplied to a temporary counter 50, the contents of which are indicated by a display device 52. The contents of the temporary counter may be manually reset to zero by pressing an operator reset button 54.

A bank of five UV-erasable, programmable read-only memories 56 are connected to the address and data busses of the microprocessor 34. The particular PROM to be read from or written to is selected by a decoder 58 which converts a 3-bit code received from the microprocessor 34 on lines 60 into a pulse on one of its output lines 62.

At the conclusion of a trip, after the ignition switch has been turned off and the timer 40 produces a 5 volt pulse, as is indicated in the lower left-hand corner of FIG. 2, this 5 volt pulse is converted to a 25 volt pulse by a DC-to-DC converter 64. This 25 volt pulse is applied to the $V_{pp}$ inputs of all of the PROMS 56; however, only that PROM which is selected by the decoder 58 by a signal at its "chip select" (CS) input will be written to. Within this selected PROM, a single bit, at the location defined by the signals on the address and data busses of the microprocessor 34, will be "burned" for permanent storage.

The microprocessor 34 is responsive to interrupt signals at three interrupt ports $I_1$, $I_2$ and $I_3$. The signal applied to the interrupt port $I_3$ is generated by an external interrogating device 66 which is used to interrogate the contents of the PROM's 56. When the interrupt $I_3$ is activated, the microprocessor "dumps" the contents of the PROM's into the interrogating device 66 via an I/O port 68.

The interrogating device may, for example, include a printer which is capable of producing a printout or "hard copy" of the milage histogram of the motor vehicle.

FIGS. 3–5 are flowcharts of firmware or software which may be used with the microprocessor 34 to carry out the functions necessary to determine and store the number of trips travelled by the motor vehicle in each milage category.

When the ignition switch 38 is first turned on, the inverter amplifier 42 applies a signal to the interrupt input $I_1$ of the microprocessor 34. This interrupt forces the microprocessor to execute a specific routine called "Permanent Counter Initialization" (PCI) illustrated in FIGS. 3A and 3B. The purpose of this routine is to scan through all the PROM's and perform a weighted sum of all the "1" bits to determine the total miles travelled by the vehicle (odometer function). After thirty seconds, the timer 44 "times out" and supplies a "load" pulse to the permanent counter 30. At this time, the total miles travelled, as computed by the PCI, are loaded into the permanent counter 30 via the I/O port 46. Thereafter, the permanent counter is incremented as the vehicle travels each mile by pulses produced on line 26.

Figure 4A:
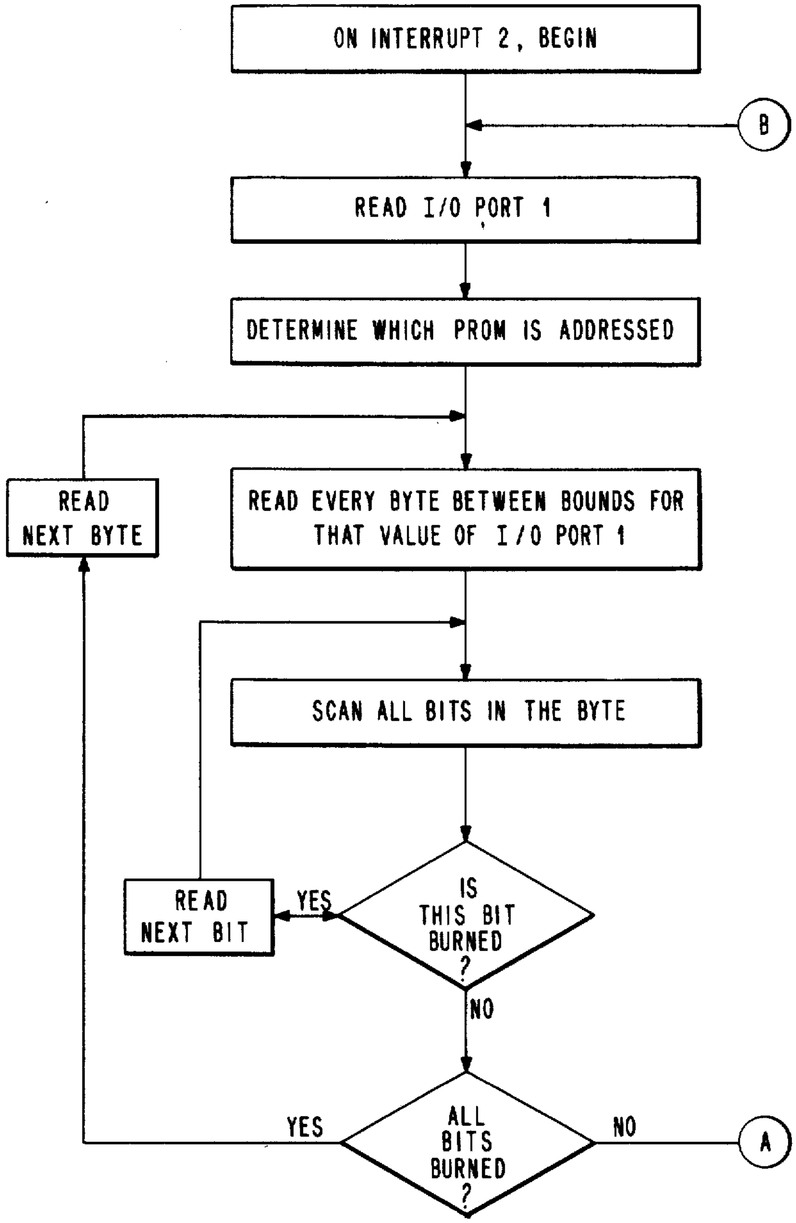
FIGS. 4A and 4B are flowcharts of a firmware routine called "Prepare to Burn Bit" used in the microprocessor in the apparatus of FIG. 2.
Figure 4B:
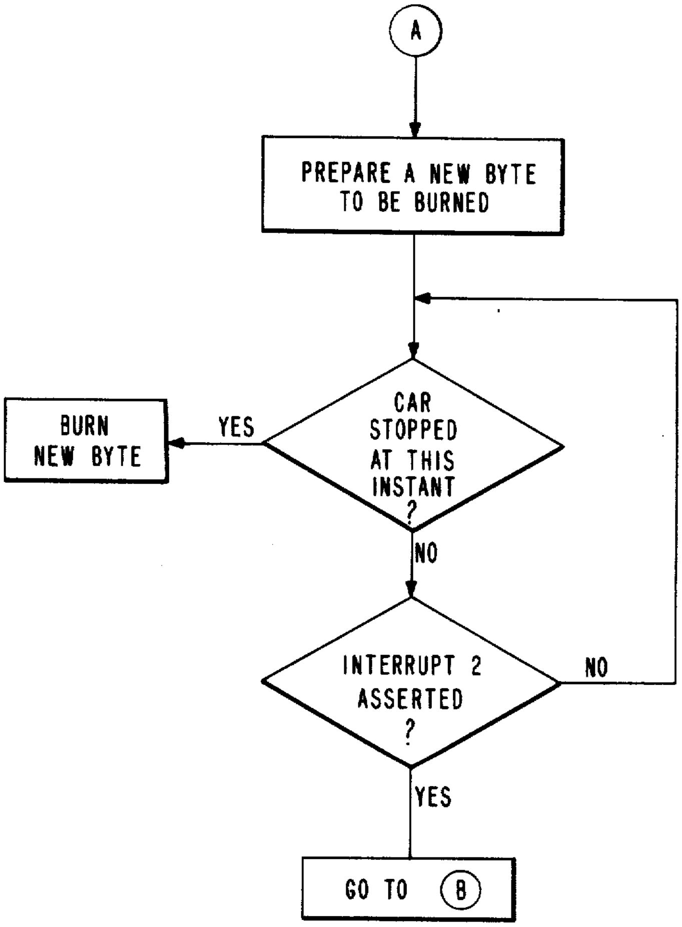

The pulses produced on line 26 (one count per mile) are also applied to a second interrupt input $I_2$ of the microprocessor 34. This interrupt forces the microprocessor to execute a routine called "Prepare to Burn a Bit" (PBB) as shown in FIGS. 4A and 4B. The purpose of this routine is the following:

Every time the interrupt $I_2$ occurs, the vehicle will have travelled one more mile. At this time, the microprocessor reads the contents of the I/O port 36 to determine the current number of miles travelled since the ignition switch 38 was turned on. The microprocessor then determines which PROM is to be addressed; it determines the proper address in that PROM; and it determines the appropriate bit within the bin which should be burned if the vehicle were to stop at this time.

The appropriate signals are applied to the control, address and data bus lines; however, no bit is burned unless the ignition switch is turned off and, thirty seconds thereafter, the DC-to-DC converter 64 applies a 25 volt pulse to the $V_{pp}$ inputs of the PROM's 56.

Figure 5A:
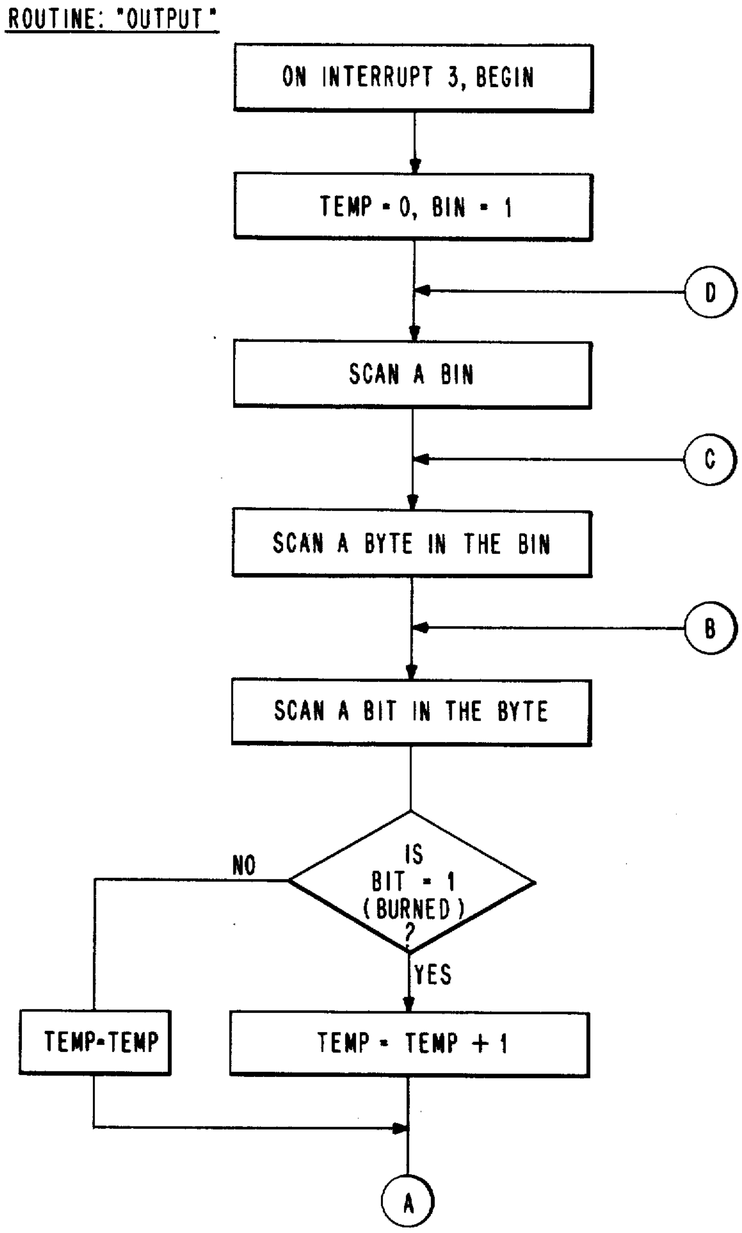
FIGS. 5A and 5B are flowcharts of a firmware routine called "Output" used in the microprocessor in the apparatus of FIG. 2.
Figure 5B:
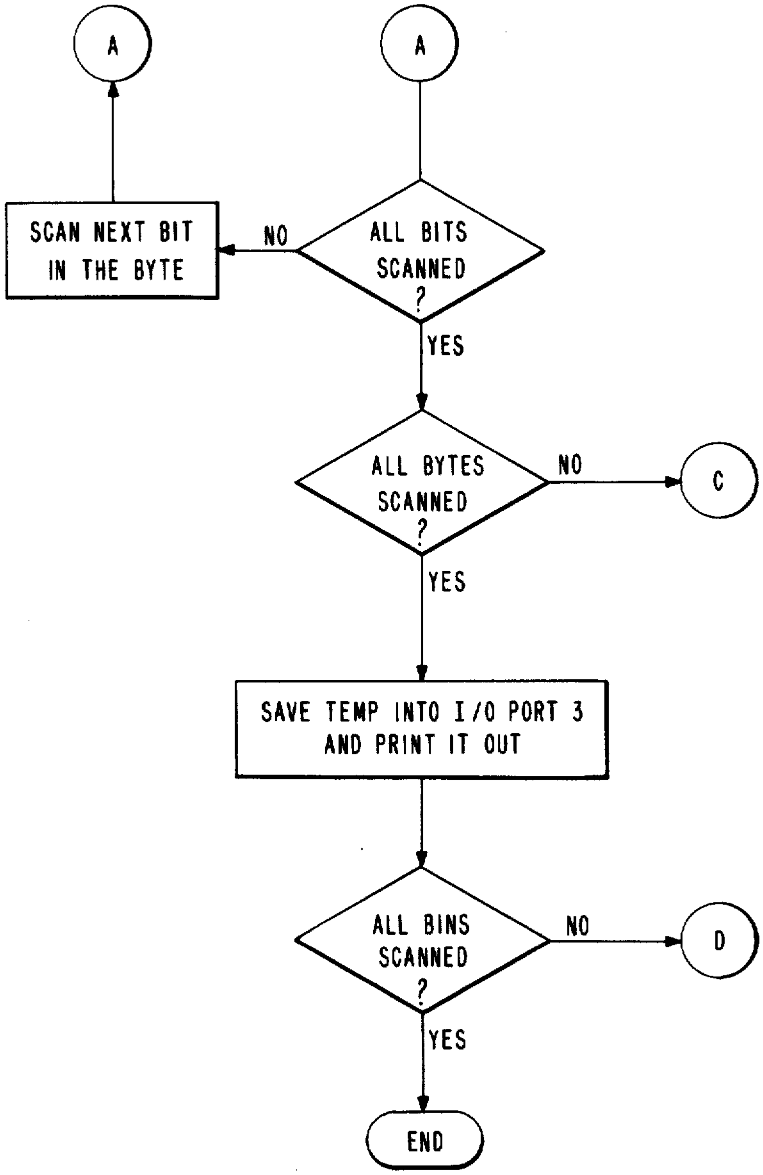

Finally, a signal applied to interrupt $I_3$ by the interrogating device 66 initiates a routine called "output" shown in FIGS. 5A and 5B. When this routine is called, the microprocessor reads the contents of the PROM's 56 and supplies this information to the interrogating device 66 via the I/O port 68.

There has thus been shown and described a novel recording apparatus which fulfills all the objects and advantages sought therefor. Many changes, modifications, variations and other uses and applications of the subject invention will, however, become apparent to those skilled in the art after considering this specification and the accompanying drawings which disclose preferred embodiments thereof. All such changes, modifications, variations and other uses and applications which do not depart from the spirit and scope of the invention are deemed to be covered by the invention which is limited only by the claims which follow.

What is claimed is:

1. Apparatus for monitoring usage to provide statistical data on historial usage of equipment being monitored said apparatus comprising:

(a) a non-volatile memory including:
 (1) a plurality of electrical inputs;
 (2) a plurality of bit storage locations organized into a plurality of groups with each location in a group associated with one type of event, all of the bits stored in said locations being originally set to the same, first logical state; and (b) memory control means, responsive to electrical signals applied to said electrical inputs, for setting said bits in selected ones of said bit locations to their opposite, second logical state, said memory control means for changing the state of each bit only once so that the bits set to their second state are substantially permanently stored; said memory control means including logic means for defining the usage in terms of predetermined events wherein each predetermined event has attributes which categorize the type of usage to occur to the normal operation of the equipment being monitored, connected to said electrical inputs of said memory, and said logic means applying electrical signals to said electrical inputs in response to the occurrence of an event, said logic means including:
 (1) first means for determining both the occurrence of an event and the type of such event;
 (2) second means, responsive to said first means, for selecting a bit location associated with the type of event determined by said first means in which the stored bit is in said first state; and
 (3) third means, responsive to said second means and connected to said electrical inputs, for producing and applying to said electrical inputs electrical signals which set the bit at the selected bit location to its second state to indicate the occurrence of said predetermined event whereby the apparatus provides current ongoing and permanent cumulative information about the frequency of occurrence of each predetermined event indicated by the number of bits which have been set to its second state in said selected bit location.

2. The apparatus recited in claim 1, wherein said memory includes at least one programmable read-only memory (PROM).

3. The apparatus recited in claim 2, wherein said at least one PROM is a fusable-link PROM.

4. The apparatus recited in claim 2, wherein said at least one PROM is an ultraviolet-erasable PROM.

5. The apparatus recited in claim 1, wherein said logic means includes means for sensing the occurrence of said events and programmed microcomputer means, connected and responsive to said sensing means, for determining the type of said events; for selecting said bit location in said memory; and for producing and applying to said inputs electrical said electrical signals.

6. The apparatus recited in claim 1, further comprising means for reading and displaying the contents of said memory.

* * * * *